(12) United States Patent
Schelkogonov et al.

(10) Patent No.: US 8,082,539 B1
(45) Date of Patent: Dec. 20, 2011

(54) SYSTEM AND METHOD FOR MANAGING WEB-BASED FORMS AND DYNAMIC CONTENT OF WEBSITE

(75) Inventors: Michael Schelkogonov, Moscow (RU); Andrey Bulanov, Moscow (RU); Alexander G. Tormasov, Moscow (RU)

(73) Assignee: Parallels Holdings, Ltd. (BM)

( * ) Notice: Subject to any disclaimer, the term of this patent is extended or adjusted under 35 U.S.C. 154(b) by 1041 days.

(21) Appl. No.: 11/953,170

(22) Filed: Dec. 10, 2007

Related U.S. Application Data

(60) Provisional application No. 60/869,388, filed on Dec. 11, 2006.

(51) Int. Cl.
*G06F 9/44* (2006.01)
(52) U.S. Cl. .......................................... 717/106
(58) Field of Classification Search .................. None
See application file for complete search history.

(56) References Cited

U.S. PATENT DOCUMENTS

| | | | |
|---|---|---|---|
| 7,269,792 B2 * | 9/2007 | Consolatti et al. ............. | 715/749 |
| 2001/0051961 A1 * | 12/2001 | Duxbury ....................... | 707/517 |
| 2003/0023641 A1 * | 1/2003 | Gorman et al. ................ | 707/530 |
| 2007/0094326 A1 * | 4/2007 | Gupta et al. ................... | 709/203 |
| 2008/0065688 A1 * | 3/2008 | Shenfield .................... | 707/103 R |
| 2008/0065769 A1 * | 3/2008 | Curtis et al. .................... | 709/226 |
| 2008/0133480 A1 * | 6/2008 | Rowley ............................ | 707/3 |

OTHER PUBLICATIONS

"Dynamic Content with DOM-2 (Part I of II)" published Nov. 26, 2004. http://developer.apple.com/internet/webcontent/dom2i.html.*

* cited by examiner

*Primary Examiner* — Anna Deng
*Assistant Examiner* — Adam R Banes
(74) *Attorney, Agent, or Firm* — Bardmesser Law Group

(57) ABSTRACT

The present invention is directed to method, system and computer program product for managing dynamic content of website. The proposed method employs processing of database elements by using active descriptors. The active descriptors contain the generic descriptions of the database elements, which properties may change with time. The dynamic descriptors are used for describing database objects. The controls build are universal and can be employed for processing several classes of objects. Each class object has sets of assigned attributes containing additional descriptions of the class object. The proposed method allows using a lightly loaded thin nucleus of the DBMS, which does not contain the information about the class attributes. The class attributes are defined by active descriptors of each particular instance of the class object.

14 Claims, 21 Drawing Sheets

FIG. 3

Journal Transaction (This screen ID: 00.01.01)

- Module:
- Number:
- Journal:
- Type: Adjustment
- Period:
- Status: Balanced
- Handling: No Action
- Ledger ID:
- Auto Reference Nbr
- Auto Reversing
- Current cycle: 0
- Number of cycles: 0
- Orig Batch number:
- Control: 0.00
- Debit Total: 0.00
- Credit Total: 0.00

- Account:
- Date: Tuesday, Jun
- Debit: 0.00
- Currency:
- Line num: 0
- Sub Account:
- Ref Number:
- Credit: 0.00
- Reconcile Status: Cleared
- Billable: Yes

[OK] [Cancel]

FIG. 4

Journal Transaction (This screen ID: 00.01.01)

Module:
Number:
Journal:
Type: Adjustment
Period:

Status: Balanced
Handling: No Action
Ledger ID:
☐ Auto Reference Nbr
☐ Auto Reversing Current cycle: 0
Number of cycles: 0
Orig Batch number:
Control: 0.00
Debit Total: 0.00
Credit Total: 0.00

| Account | Sub | Date | Credit amount | Debit Amount | Currency | Description | Reconcile Status |
|---|---|---|---|---|---|---|---|
| ABC | ABC | 6/6/2006 | 123.45 | 123.45 | abc | abc | |
| ABC | ABC | 6/6/2006 | 123.45 | 123.45 | abc | abct | |
| ABC | ABC | 6/6/2006 | 123.45 | 123.45 | abc | abct | |
| ABC | ABC | 6/6/2006 | 123.45 | 123.45 | abc | abct | |

Journal Transaction (This screen ID: 00.01.01)

Module: GL
Number:
Journal: CG
Type: Nonrecurring
Period: 05-2006

Status: On Hold
Handling: No Action
Ledger ID: ACTUAL
☐ Auto Reference Nbr
☐ Auto Reversing Current cycle: 0
Number of cycles: 0
Orig Batch number: 12.00
Control:
Debit Total: 0.00
Credit Total: 0.00

| Account | Sub | Date | Credit amount | Debit Amount | Currency | Description | Reconcile Status | Billable | Ref N |
|---|---|---|---|---|---|---|---|---|---|
| * 1234 | 0000 | 6/6/2006 | 12.00 | 0.00 | BAS | Test| | Outstanding | Yes | |

FIG. 7

Journal Transaction (This screen ID: 00.01.01)

Module: GL
Number:
Journal: CG
Type: Nonrecurring
Period: 05-2006

Status: On Hold
Handling: No Action
Ledger ID: ACTUAL
☐ Auto Reference Nbr
☐ Auto Reversing Current cycle: 0
Number of cycles: 0
Orig Batch number: 12.00
Control:
Debit Total: 0.00
Credit Total: 12.00

| Account | Sub | Date | Credit amount | Debit Amount | Currency | Description | Reconcile Status | Billable | Ref N |
|---------|------|----------|---------------|--------------|----------|-------------|------------------|----------|-------|
| 1234 | 0000 | 6/6/2006 | 12.00 | 0.00 | BAS | Test | Outstanding | Yes | |
| | 0000 | 6/6/2006 | 0.00 | 0.00 | BAS | | Outstanding | Yes | |

FIG. 8

Journal Transaction (This screen ID: 00.01.01)

Module: GL  Status: Unposted
Number: 000223  Handling: No Action
Journal:  Ledger ID: Actual
Type: Nonrecurring  ☐ Auto Reference Nbr
Period: 05-2006  ☐ Auto Reversing Current cycle: 0
Number of cycles: 0
Orig Batch number: 231321
Control: 300.15
Debit Total: 300.15
Credit Total:

| Account | Sub | Date | Credit amount | Debit Amount | Currency | Description | Reconcile Status | Billable |
|---|---|---|---|---|---|---|---|---|
| 1234 | 0000 | 5/29/2006 | 1213.15 | 0.00 | BAS | Some data | Outstanding | Yes |
| 1234 | 0000 | 5/29/2006 | 0.00 | 123.15 | BAS | there data | Outstanding | Yes |
| 1234 | 0000 | 5/29/2006 | 32.00 | 0.00 | BAS | test | Outstanding | Yes |
| 1234 | 0000 | 5/29/2006 | 0.00 | 12.00 | BAS | 53w5 | Outstanding | Yes |
| 1234 | 0000 | 5/29/2006 | 0.00 | 20.00 | BAS | 234324 | Outstanding | Yes |
| 1234 | 0000 | 5/29/2006 | 22.00 | 0.00 | BAS | 234324 | Outstanding | Yes |
| 1234 | 0000 | 5/29/2006 | 0.00 | 22.00 | BAS | data test | Outstanding | Yes |
| 1234 | 0000 | 5/29/2006 | 123.00 | 0.00 | BAS | This is it | Outstanding | Yes |
| 1234 | 0000 | 5/29/2006 | 0.00 | 123.00 | BAS | One more | Outstanding | Yes |

FIG. 10

Journal Transaction (This screen ID: 00.01.01)

Module: GL  Status: On Hold ▸  Current cycle: 0
Number: ▢  Handling: Release Now ▸  Number of cycles: 0
Journal: CG  Ledger ID: ACTUAL  Orig Batch number: 13.00
Type: Nonrecurring ▸  ☐ Auto Reference Nbr  Control: 12.00
Period: 05-2006  ☐ Auto Reversing  Debit Total: 12.00
                                    Credit Total: 12.00

| Account | Sub | Date | Credit amount | Debit Amount | Currency | Description | Reconcile Status | Billable | Ref N |
|---|---|---|---|---|---|---|---|---|---|
| 1234 | 0000 | 6/6/2006 | 12.00 | 0.00 | BAS | test | Outstanding | Yes | |
| 4534 | 0000 | 6/6/2006 | 0.00 | 12.00 | BAS | test | Outstanding | Yes | |

FIG. 11

Class Generator

Properties

Table Name: GLTran    Class Name: GLTran
                     Namespace: SW Sample

[Append UI Attribute]    [«]  [»]

- LineNbr
- Module
- Acct
- ApplfedDate
- Balsnc&Type
- BaseCuryID
- CurijRate
- CuryflateType
- DrAmt
- Crtd_Prog
- EmployeeID
- ExtRefNbi
- FiscYr
- LUpd_User
- NoteID
- OrigAcct
- OrigBarNbi
- OrigSub
- PC_Flag
- PC_Status
- PerEnt
- PerPost
- Posted
- PioiecdO
- RefNbr
- RcvEntryOption

| | Active | Attribute | Constructor |
|---|---|---|---|
| ▲ | ☑ | DB Str ▶ | SWDBString |
| | ☑ | Default ▶ | SWDefault |
| | ☑ | UI Field ▶ | SWUIField |
| ✱ | ☐ | ▶ | |

Relations

Parent View: Batch ▶

| | Active | Child Key | Parent Key |
|---|---|---|---|
| ▲ | ☑ | Module ▶ | Module ▶ |
| | ☑ | BatNbr ▶ | BatNbr ▶ |
| | ☐ | | ▶ |

[Generate]    [Cancel]

FIG. 12

Fields schema editor

| | Data Field | Data Type | Control Type | Caption |
|---|---|---|---|---|
| ☑ | Module | String | TextEdit | BatNbr |
| ☑ | BatNbr | String | Selector | AutoRev |
| ☑ | AutoRev | Int16 | NumberEdit | AutoRevCopy |
| ☑ | AutoRevCopy | Int16 | NumberEdit | BalanceType |
| ☑ | BalanceType | String | TextEdit | BatType |
| ☑ | CuryCrTot | String | ComboBox | CwyDxTot |
| ☑ | CuyCltrTot | Double | NumberEdit | CwyDxTot |
| ☑ | Cycle | Double | NumberEdit | Cycle |
| ☑ | JrnlType | Double | NumberEdit | Journal Type |
| ☑ | LedgerID | Int16 | TextEdit | Ledger ID |
| ☑ | Nbrfycle | String | Selector | NbrCycle |

◀ Move Up   ➡ Move Down   Select All   Clear All   Display selected

- Apperarance
  - Caption    BatNbr
  - FieldList  StringArray
    - [1]      BatNbr
    - [2]      Status
- Behavior

View Name
The view object name associated with the field

Control Columns
- Columns count: 3
- Controls Count: 10

Control Layout
- Label Space: 100
- Control Width: 100
- Vertical Shift: 28
- Horizontal Shift: 8

☐ Generate Binding Expression

OK   Cancel

ProjectX > Accounts Payable
Vendor

Cancel  Insert  Save  Delete  First  Prev  Next  Last  Up Level  Refresh  Log Out  Help
Screen ID: AP.20.20.20

Account Info

Account ID: TEST900001
Account Name: Test Vendor 2345
Status: Active

| General Info | Payment Info | Shipping Location | Other Location | Contacts | GL Accounts |

Accounts & Sub-Accounts

AP Account: 2000000000  Imported
AP Sub: 0000-FC-VR00-00  Imported
Expense Account: 1000000000  Imported  Sub Acct Added During Posting
Expense Sub: 0000-00-0000-00
Discount Account: 1000000000  Imported  Sub Acct Added During Posting
Discount Sub: 0000-00-0000-00  Sub Acct Added During Posting

SYSTEM AND METHOD FOR MANAGING WEB-BASED FORMS AND DYNAMIC CONTENT OF WEBSITE

CROSS-REFERENCE TO RELATED APPLICATIONS

This application is a non-provisional of U.S. Provisional Patent Application No. 60/869,388, filed on 11 Dec. 2006, entitled METHOD FOR MANAGING DYNAMIC CONTENT OF WEBSITE, which is incorporated by reference herein in its entirety.

BACKGROUND OF THE INVENTION

1. Field of the Invention

The present invention relates generally to website development, and, more particularly, to a method, system and computer program product for managing dynamic content of website.

2. Background Art

Current development trends in the fields of enterprise resource management (ERP) or its close "relation", customer relationship management (CRM), involve moving some of the functionality of the ERP/CRM software from the client side to the server side. This is generally driven by the fact that supporting multiple hardware platforms, multiple operating systems, multiple versions of operating systems (or different/evolving hardware and software) is fairly burdensome for a corporation's IT department. The maintenance of such ERP software, the need for frequent updates, and so on, all combine to make such ERP software relatively resource intensive. At the same time, vendors who provide the software also need to support multiple hardware and software platforms, requiring additional developer effort, additional support from the vendor, and so forth.

Browser-based forms are known in the art, where a form is shown to a user on a web page, and the user can fill in the form. Such conventional browser-based software can work with HTML code. However, the functionality of such forms is fairly limited, and the interface between the forms and the actual software that uses the data in the forms, is also fairly limited.

Websites typically display, to a user, some data retrieved from a database. Connections between the displayed formatted reports and the tables of the database are maintained by computer software. A significant part of Operating System resources is used for creation of report forms and formatting of data being displayed on the website.

Conventional methods do not offer any capabilities for creation of generic graphical report forms, which can be populated by generic data. This is partly due to the fact that the proprietary database interface cannot be replaced. The structure of the database defines a particular format of requests, making it difficult to create a generic form populated by a generic data.

However, when user interfaces are created, or when other operations are performed, such as creation of binary reports, the proprietary database forms supplied with a DBMS (Data Base Management System) do not need to be created. On the other hand, direct access of a database by a client computer has a number of disadvantages, such as increased traffic and computational overhead associated with execution of scripts, which have to be processed by a command interpreter right on the client computer.

Accordingly, there is a need for a computationally efficient method for generation of generic report forms that can be populated with generic data, and for a system and method that permits an enterprise to generate user fillable forms, based on business logic, which are not resource intensive, from the enterprises perspective, which are reusable, and which are maximally granular.

SUMMARY OF THE INVENTION

The present invention relates generally to website development, and, more particularly, to a method, system and computer program product for managing dynamic content of website. The proposed method employs processing of database elements by using active descriptors. The active descriptors contain the generic descriptions of the database elements, which properties may change with time.

The dynamic descriptors are used for describing database objects. Thus, the requirements for creation of controls can be minimized. The created controls are universal and can be used for processing several classes of objects.

Each class object has its attributes, the additional descriptions of the class object. The proposed method allows using a thin nucleus of a DBMS, which does not store the information about attributes. Instead, the class attributes are defined by active descriptors of each particular instance of the class object.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention. In the drawings:

FIG. 3 illustrates a screen shot of the run-time data rendering.

FIG. 4 illustrates a screen shot of the design-time data rendering (front view).

FIG. 5 illustrates a screen shot of the design-time data rendering (grid view).

FIG. 6 illustrates a screen shot of the design-time view with turned off rendering (Standard Visual Studio.NET appearance).

FIG. 7 illustrates a screen shot of a form for creating a new document.

FIG. 8 illustrates a screen shot of a form for updated document.

FIG. 10 illustrates a screen shot of a form for a document with an un-posted status.

FIG. 11 illustrates a screen shot of an example of a form for a document with invalid values.

FIG. 12 illustrates a screen shot of a table cache designer.

FIG. 14 illustrates a screen shot of a web form designer.

FIGS. 15-21 show additional screenshots of the form design process.

DETAILED DESCRIPTION OF EMBODIMENTS OF THE INVENTION

Figure 1:
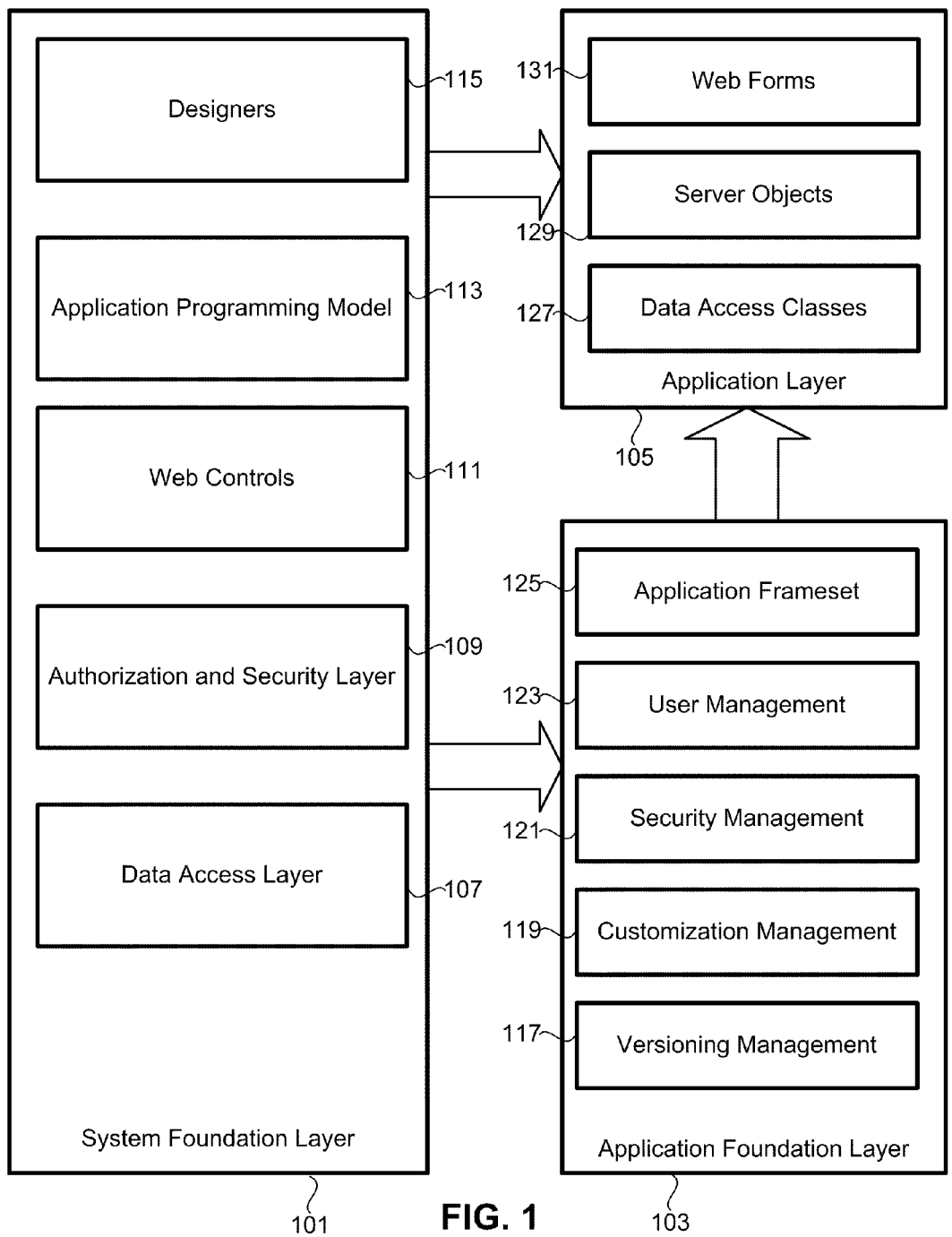
FIG. 1 illustrates major components of a development platform.

Reference will now be made in detail to the embodiments of the present invention, examples of which are illustrated in the accompanying drawings.

The present invention is directed to a method, system and computer program product for managing dynamic content of website.

Also, the present invention is directed to a system and method for dynamically generating fillable form-type web page content, that is independent of a browser, which is compact, easy to use, easy to adapt for a particular business or company, and which is based on a finite set of components/primitives that represent an object which are the entities in which the company deals with.

Such object typically reflect a company's business, and are normally found on the general ledger and the so called "accounts" such as accounts receivable, expense accounts, assets, liabilities, and various subcategories of the above, and so on. Some of the components/primitives can deal with a field in a form, and can have some logic that corresponds to the "nature" of the field. For example, if a field requires a user to enter his tax ID, that field will be restricted to 10 numeric characters, possibly with an option for a dash (making it 11 characters). Other rules for objects/components corresponds to real world rules, in other words, a field for value added tax a VAT should not have more than 100% or some specified amount, of the value of the item.

Other components can relate to the rules for sales, inventory, people/personnel, discounts, and so forth. An object or component, is therefore responsible for encapsulating some business logic associated with the underlying "thing" (or entity, or transaction), however, by making the primitives as simple as possible, and by giving the user a set of options to relate one component to another component, the objective of maximum granularity and re-use of the components is achieved.

An event driven engine connects the components in the object model, and permits the components to interact with the engine and with each other. An event handler is invoked in response to a user entering data. This can take place during entry (for example, when the user has not completed entering his tax ID, but where the entries are clearly not part of the numeric character set that is permitted, the user can be notified. Furthermore, once the user has finished entering the data, the event handler informs the engine of the fact, and the database is therefore updated, as well as the related components.

The form is generated on the server side, and displaced to a user, in a manner that is essentially a browser independent. The form itself also has events, such as controls relating to appearance of the form and possibly some of the fields. Such controls can be, for example, "I have been closed", "I have been moved", and so forth.

The component/primitives that relate to the general ledger accounts are primarily transaction driven. This can also include such things as prices, currency, units sold, inventory units, accounts receivable, accounts payable, and so forth.

The formatting of the field can be specified at design time, such that there is no need to write client side code—the entire logic can exist on the server side, and, using a middle ware layer and interaction protocols, connect actions at the client computer to the database.

The proposed method employs processing of database elements by using active descriptors. The active descriptors contain the generic descriptions of the database elements whose properties may change with time. The dynamic descriptors are used for describing database objects. Thus, the control builds are universal and can be employed for processing several classes of objects.

Each class object has sets of assigned attributes containing additional descriptions of the class object. The proposed method allows using a lightly loaded thin nucleus of the DBMS, which does not contain the information about the class attributes. Instead, the class attributes are defined by active descriptors of each particular instance of the class object.

The nucleus of the DBMS normally creates an instance of a class by setting up attributes for this class and by forming an event from a standard for this class set of events. Thus, for all of the instances of the same class the same set of events (for example 16) is used. Therefore, the nucleus of the DBMS is used only for creating the instances of the class and for generation of the events. The method of data processing is defined by the attributes of the particular instance of the class and by the events used by this class.

In this case, the data requests and processing of the data are performed using a generic format. In some cases, the instances of the same class can require, for example, when reading the data, to have data presented in different formats, including preliminary processing of data (such as, for example, encryption, truncating extra data, checking authenticity of data, and matching data to a mask). However, the type of processing is defined by the attributes.

For supporting the appropriate processing of an instance of a class, the attribute database is used. In this case, the attributes of the class, generally, are not static parameters describing the properties of the class, but can invoke the events of the nucleus.

For example, for presenting the data in the form suitable for transfer over open networks, the special data record processing may be required. This data record processing is viewed by the nucleus as an attribute. Such an attribute can be encryption, reformatting, truncation of extra bites of record, etc. For invoking the events of the nucleus, active attributes have special active process handlers.

Note, that this method of data processing allows for presentation of data in XML format without any graphical presentation of data. Thus, a lot of operational time normally spent on graphics and rendering is saved. Also any object can be used without creation of an interface.

When data processing is defined by the active handlers from the point of view of the nucleus of the DBMS the data processing is not performed, because the data output format defined by the event is always the same. Thus the nucleus invokes the event and defines the field of the request.

Additionally the attributes can include controls used in the WINDOWS operational environment. Also, the type of events can have a web interface, which forms the scripts and prepares data in the required format. In this case, the events on the server and their analogs on the client can function together. Thus, data processing in a client-server system does not use the controls, which decreases the time used for rendering significantly.

When processing records on the client side, the logic is executed at the event level, which unloads the nucleus of the DBMS. The client side does not need any rendering on the server side, and all the necessary functions are performed locally using controls of the client computer.

The business logic is written in the attributes same as the handlers. The separate events are used for creation of the interface. When the field attributes are requested, the handlers are called instead. The handlers can form the states, such as error, size and length of the record. All is then returned to HTML format, where the field type (key, length, processing) is set automatically. The descriptors of each field are used for interaction with the database.

The fields can be different, and instead of the value of incorrect operation, a user can get the state of the record, in which an error is shown as the state. If the record needs to be converted to the format of the filed of the table, the special class is associated with the table. This class describes the behavior (for example length, format, upper case only, etc.) of this field.

The correct presentation of data is performed with the help of active descriptors. The static information about the filed length is used by processor, which converts data into an appropriate format. In this case, the nucleus of the DBMS does not need to know about the processor, which updates the field on its own.

The nucleus is not connected to any interface, and the tables are always called in the same way. Upon request the nucleus calls the event before processing any objects.

Data retrieval from a database performed with a key, then the values are given to an interface with possible encoding. For example the nucleus requests a credit card number and returns after invoking on the processor a bunch of "Xs" and only a part of the number.

Retrieval and formation of data for the database is performed by using event requests. The output of a substituted number is performed by different events and controls. When the type of class is initialized, the attributes are analyzed. These attribute are used for class processing and even subscriptions.

For some classes it is necessary to form several sets of attributes because in some cases it is needed to store the information about transactions associated only with a particular instance of a class. When update of a record is performed, a copy of the attributes for the line and for the interface is created. It allows not to keep additional data related to a state of an object. In this case for the objects the set of business rules is created.

The proposed method allows for the attributes associated with a particular field to be encapsulated, and complex business logic is not needed. The same processors for different fields can be used.

The events are generated by the nucleus, and the subscription is performed through the controls. The events of the nucleus are server-based events. The events are not generated by the control, because the control passes the values for processing, but does not actually perform data processing and updating. The predefined set of attributes allows for checking attributes for validity.

When a change in the interface is required, no changes in the logic are needed, because the attributes are transparently associated with the field.

The proposed embodiments provide a rapid application development environment including:
  Clear separation of GUI and business logic;
  Single programming language model (no HTML);
  Set of components to automate application creation;
  System Application Framework; and
  Set of tools and wizards to reduce amount of manual coding.

They also provide tools for customization and integration with external systems:
  Business logic available through generic API (SOAP/XM-LRPC);
  Tools for customizing application on GUI and business logic levels; and
  Tools for developing add-on modules (System Application Framework)

FIG. 1 illustrates the major components of the development platform used. System Foundation layer 101 is a set of low-level components with functionality required for creating an application. The main ideas behind the system foundation layer 101:

(1) Isolate application programmer from complexities related with coding of Internet available application such as knowledge and use of HTML, CSS, HTTP and JavaScript standards. (2) Provide single language development environment, where all pieces of GUI, business logic and database access are coded within the same environment. (3) Provide a set of low level components to automate creation of GUI elements, implement businesses functionality, access application database and enforce data security. (4) Provide application programmer with simple, logical, easy to understand and standard model for implementing database access, business logic and GUI. (5) Provide a set of high level tools and utilities to speed up and automate creation of business and GUI components and at the same time enforce application integrity.

System Foundation Layer 101 includes of following components:

Data Access Layer (DAL) 107: A set of low-level components responsible for database access, data manipulations primitives and persistence management. Authorization and Security Layer (ASL) 109: A set of low-level components responsible for user authorization and access rights verification on data access business logic levels. Web Controls 111: A set of web controls for GUI creation. Application Programming Model (APM) 113: A set of low-level components and primitives that glue together DAL, ASL, and Web Controls and provide application programmer with model and API for implementing business logic and GUI. Designers 115: A set of components to automate creation of DAL (Data Access Classes) and GUI (Web Forms) components.

Application Foundation Layer 103 is a set of high-level components and database structures implemented on top of System Foundation Layer 101 to provide the application programmer with ready-to-use components and a framework for creating and extending business applications. By using application frameset 125, the application programmer can focus on implementing business logic modules and then plug them into the application frameset 125 to deliver to the end user as a fully-functioning business application.

Application Foundation Layer 103 provides the application developer with such high level primitives as:

Application frameset 125: A set of components and database structures determining application layout and navigation. User management 123: A set of components and database structures for storing user information and his personal settings, such as screen layout, sort ordering, favorites and regional settings specific for individual user. Security management 121: A set of components and database structures for role based security and authentication management. Versioning management 117: A set of components and database structures for upgrading business logic and application database components. Customization management 119: A set of components and database structures for creating, storing and applying to GUI, business logic and database metadata containing information on visual, functional and database modifications created by application users to alter standard functionality.

Application layer 105 is a set of components implementing application business logic. These components are implemented by the application programmer on top of the system foundation layer 101 and application foundation layer 103. Application layer 105 can be divided into:

Data Access Classes (DAC) 127: table or web service wrappers that are responsible for communicating with database or web service. Data Access Classes 127 are implemented on top of Data Access Layer 107 and Authorization and Security Layers 109.

Data Access Classes 127 creation is automated with a specialized designer. Server Objects 129: class that is created on top of one or more Data Access Class 127 using Application Programming Model 113. It includes two sections: (i) Object Model, a list of included data access classes and their relationships and (ii) Business Logic, section where application business functionality is programmed.

Web Forms 131: declarative description of Server Object representation in GUI. Generation and modification of Web Froms 131 is automated with a specialized designer.

To provide a Windows-like GUI through the browser, "windows like" set of controls through browser DOM and provide an effective way of communication between these controls and server objects 129 via XMLHttpRequest. This could be referred as an AJAX application model (http://en.wikipedia.org/wiki/AJAX).

AJAX programming model assumes use of Java Scripts located on the client side. This approach is not secure, because using JS debugger, the user can receive control over JS code and perform data manipulation. With this knowledge, the application cannot trust any data sent from client. All business logic and data validation rules must be at least duplicated on server side. JS on the client side should only be trusted to handle initial data format verification and synchronization of business object representation in browser window, with the main business object located on application server. All application logic and data validation is encapsulated inside server objects that run on the server side, and which are not exposed to the browser's DOM. This is valid only for applications where data manipulation on user side is not acceptable, like business applications. For a large range of applications, like Google map, the logic could be moved to the client browser.

Application written in this manner provide a good performance advantage over unreliable and latent internet connection. To address this issue, the following techniques are implemented: Java Scripts are moved into static generic classes that are loaded one time on login and then cached by browser. The static HTML part of form is minimized to be less than 60 KB, the rest of the form is loaded on demand. After initial form load, only modified data are sent between client and server to minimize network traffic and improve response time. Performance that is better than similar Windows applications accessed through Citrix or MS remote desktop over the similar connection can be achieved.

Any application could be accessed through Internet Explorer, Mozilla Firefox and Netscape Navigator browsers. Other browsers, such as Konqueror, Safari and Opera, are also contemplated. In general, a GUI written as described herein supports any browser that is compatible with Level 2 Domain Object Model.

Normally, server objects 129 are created on each request and disposed after each request execution. Object state is restored and saved into session trough serialization mechanism. Session size is minimized to store only modified server object data (inserted, deleted or modified records). The rest of object state is extracted from the database on demand and built around the session data. A custom serialization mechanism implemented to serialize only relevant data and reduce amount of service information. Hash tables, constraints, relations and indexes inside server object are created strictly on demand, which allows to avoid execution of expensive operations on each object creation.

One of the critical aspects of delivering an application with SaaS model is providing good application density. In general, web based applications already provides a benefit over Windows-based applications executed through Microsoft remote desktop or Citrix, because of lower memory consumption and shared resource pooling. Using AJAX application development platform allows to achieve even better application density compared to standard web based applications because of two factors: Expensive HTML rendering operation is performed once only, on initial page load. All subsequent requests to the same page do not trigger HTML rendering that significantly reduces CPU load on application server.

Exchanging only modified data between client application and server side significantly reduces network traffic and processing time on the server side. The AJAX application model does not provide any guideline for implementing business logic. Conventionally, most of the AJAX toolkits are limited to a set of javascripts that handle creation of GUI elements through browser DOM and a set of javascripts that handles operations with XMLHttpRequest object. The application programmer is responsible for implementing the server part as a set of specialized web services and should implement java script that invokes these web services and performs interaction with GUI elements based on response. In this case, business logic is spread between client java script and web services.

This approach inherits following drawbacks:

The application programmer has to write the application code in two places: web services on server side and java script on client side. This increases the number of errors and complicates code debugging and maintenance. To prevent malicious data manipulation, the application programmer should duplicate all critical data validations on server side. In many cases this results in business code duplication and various synchronization errors. Exposing business logic through a set of specialized API functions often requires duplication of business logic on multiple machines that increases development time and subsequent cost of code maintenance.

Here a new mechanism is proposed, using ASP.NET 2.0, where XMLHttpRequest could be executed towards the original web form that generated the html page. This mechanism allows implementation of standard communication protocol of exchanging data between client browser and server object on application server. The communication mechanism is implemented in following way: change of control value on browser side triggers an execution of static java script through browser DOM. This script collects information on changed control values and creates an XML document containing changes. This XML document is sent to the server in form of XMLHttpRequest towards the original web form. The server receives the XML document, transforms it to data collection and passes this data collection to the server object that runs behind requested web form. Population of server object elements with new values triggers the execution of business logic. Upon completion of business logic execution, changes in server object state are collected by the web form 131. Instead of generating HTML response, the web form 131 compiles changed values into XML document and sends back to the client browser as a response on XMLHttpRequest. Java script receives server response and updates page controls with new values from received XML document.

This technology addresses following issues:

A javascript that implements communication between browser and server is static. It does not contain any business logic. It is loaded once only, during initial application load and it shared across all application pages. After initial form load, only modified data is sent between client and server to minimize network traffic and improve response time.

Communication is performed through small XML documents, avoiding expensive page rendering operation on server side. The Application programmer does not implement any business logic in JavaScript and does not deal with HTML and DOM. All such logic is incorporated on system level within web controls. All business logic is programmed at a single place, within the server object 129.

Figure 2:
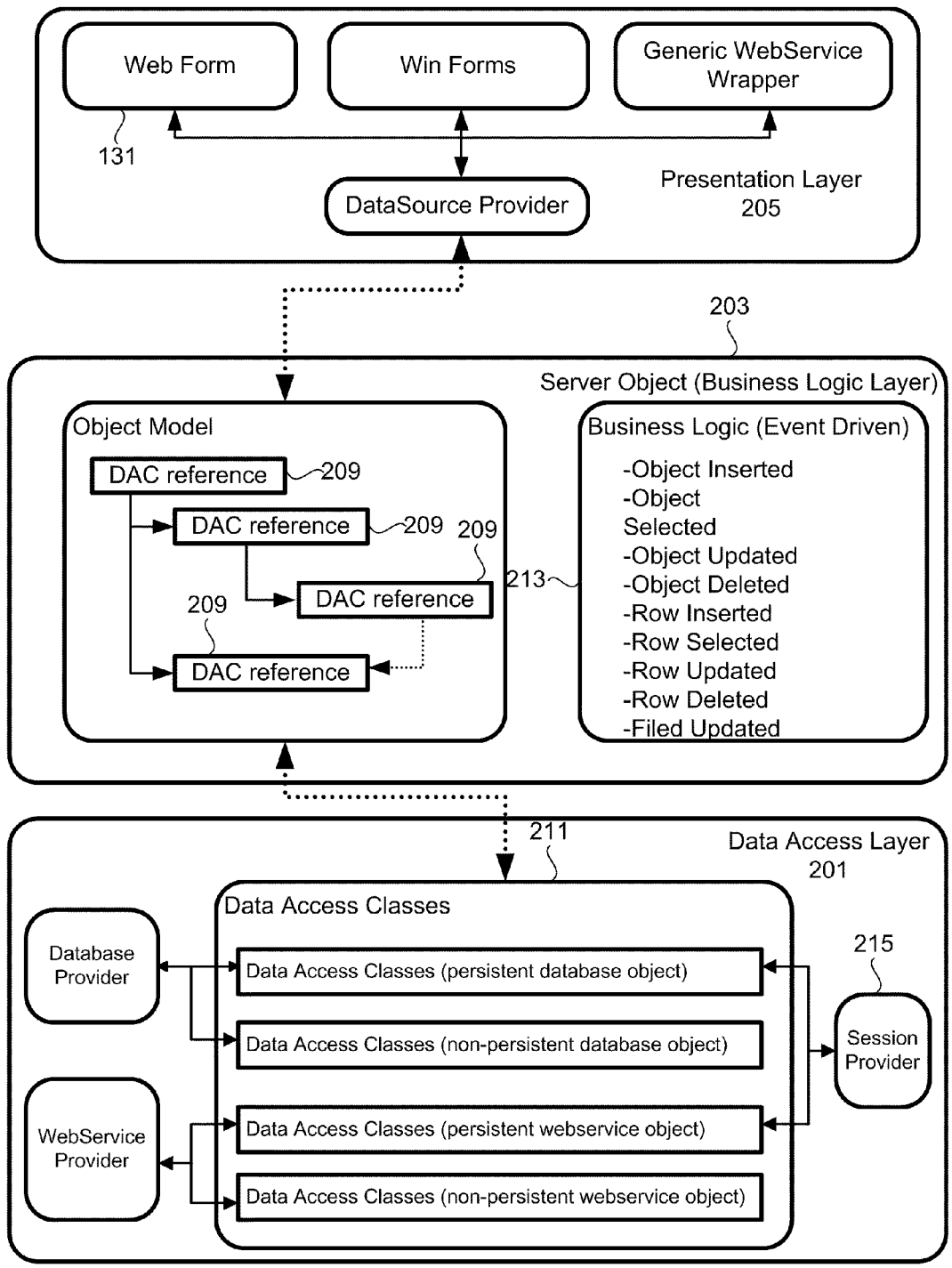
FIG. 2 illustrates a run-time interaction model.

FIG. 2 illustrates the application run-time interaction model. System run-time components provide service functions to application code during its execution including:
Database access layer 201;
Security and access rights validation;
HTML generation;
GUI rendering on browser side (Java Scripts);
Communication protocols; and
Customization support.

Presentation Layer 205 is responsible for GUI generation and providing communication between browser and server objects 129. It includes a set of Web Forms 131. When a user requests a new web page from a server the web form 131 is responsible for accepting request and generation of the static HTML part of requested application page and generation of additional service information required for AJAX controls rendering. When a user receives requested page and start data browsing or data entry, web form 131 is responsible for receiving asynchronous HTTP requests from browser, restoring the application page state on server, passing changed control values to the server object for business logic execution, collecting changed server object state, generating response in form of XML document and sending it back to the browser. Server objects 129 also could be accessed through generic web services that are also a part of presentation layer. Unlike Web Forms 131, web services are automatically generated from the Server Objects 129 metadata information.

Business logic layer 203 is implemented inside Server Objects 129. Server objects 129 are classes responsible for business logic execution within the application namespace. Each Server Object 129 includes two sections: (i) Object Model 207, a list 209 of included data access classes 211 and their relationships and (ii) Business Logic 213 section, where application business functionality is programmed. Each Server Object 129 could be accessed from the Presentation Layer 205 and from another Server Object 129 within same application namespace. When Server Object 129 receives an execution request, it extracts data required for request execution from the Data Access Classes 211 based on Object Model 207, triggers Business Logic 213 execution, returns result of business logic 213 execution to requesting party and updates Data Access Classes 211 with changed data.

Data access layer 201 is implemented as a set of Data Access Classes 211. Data Access Classes 211 are classes within application namespace responsible for communicating with database or web service and providing data management API a persistence support to Server Object 129. Data Access Classes 211 are responsible for basic data validation, application integrity enforcement and database communication through attribute mechanism and for providing data management API to Server Object 129. Data management API includes such primitives as select, insert, delete, persist, sort, search and other data access and persistence management operations.

Data Access Class 211 content includes unchanged data part that is retrieved from the database and saved into the database on each request to Data Access Class 211 content and a persistent part that contains modified data. All modified data are stored in session though standard session provider 215 configured for .NET application. Table caches are organized so that only data requested for business logic 213 execution are retrieved from the database or session.

A set of web controls to is used generate advanced graphical user interface inside Internet browser. Creation of consistent, professional-looking GUI is a complicated task. A special attention paid to GUI development and all web controls supports the same rendering and appearance in design mode as in runtime mode. This allows the developer to utilize all facilities of, e.g., Visual Web Designer component of Visual Studio. The application developer can use convenient drug-and-drop mechanism to create application form layout, perform form visual editing and set control properties and behavior through an intuitive graphical interface. This approach does not require any knowledge of HTML or Java Script by developer and allows him to focus on business logic of the application, at the same creating professional-looking GUI.

Figure 3:
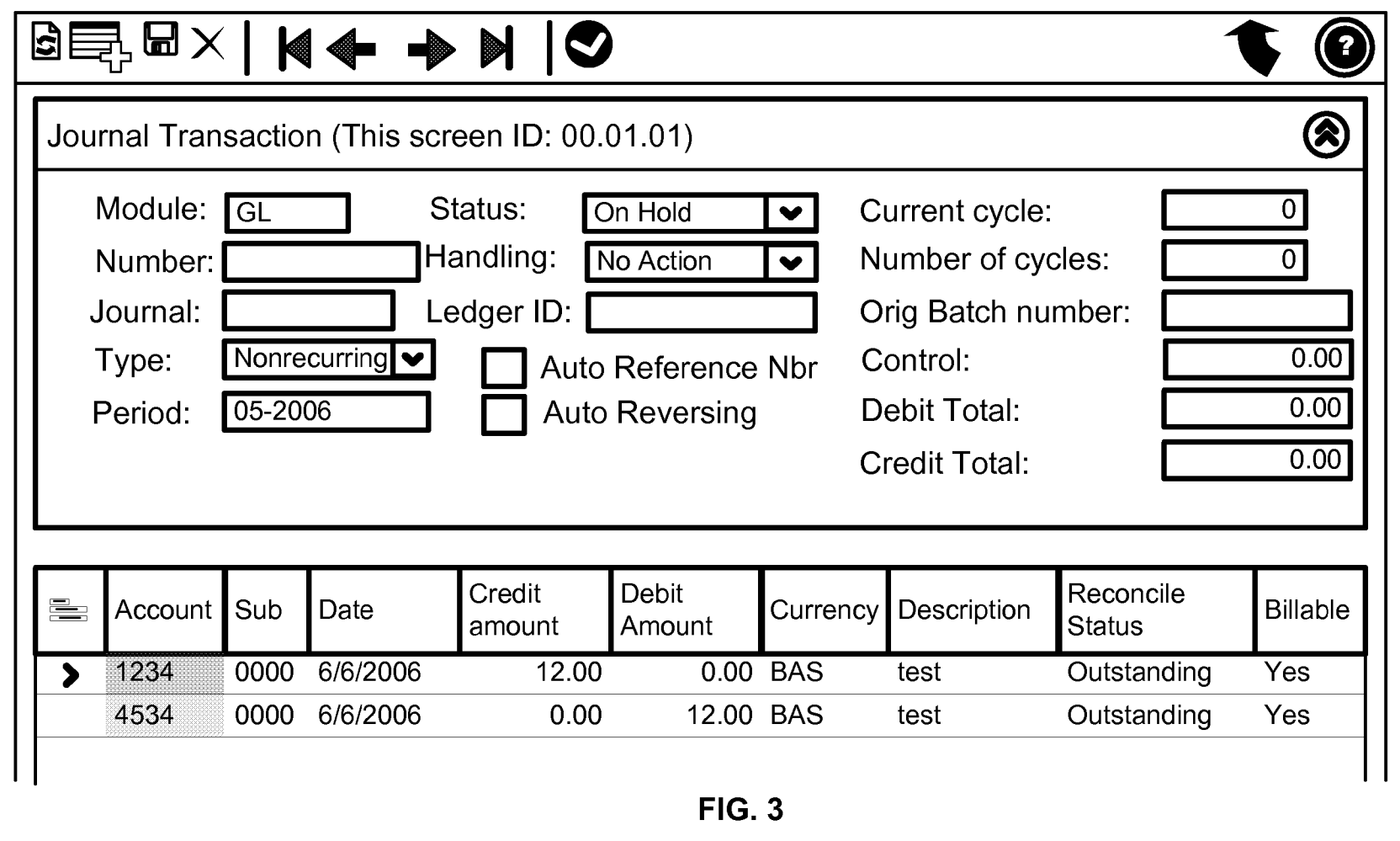

Examples discussed below illustrates design versus runtime rendering, see FIG. 3, which illustrates an example of a screen shot of the run-time data rendering. The data is displayed as the events are being executed.

FIG. 4 illustrates an example of a screen shot of the design-time data rendering. The fields of the form can be edited or updated in the design-time.

Figure 6:
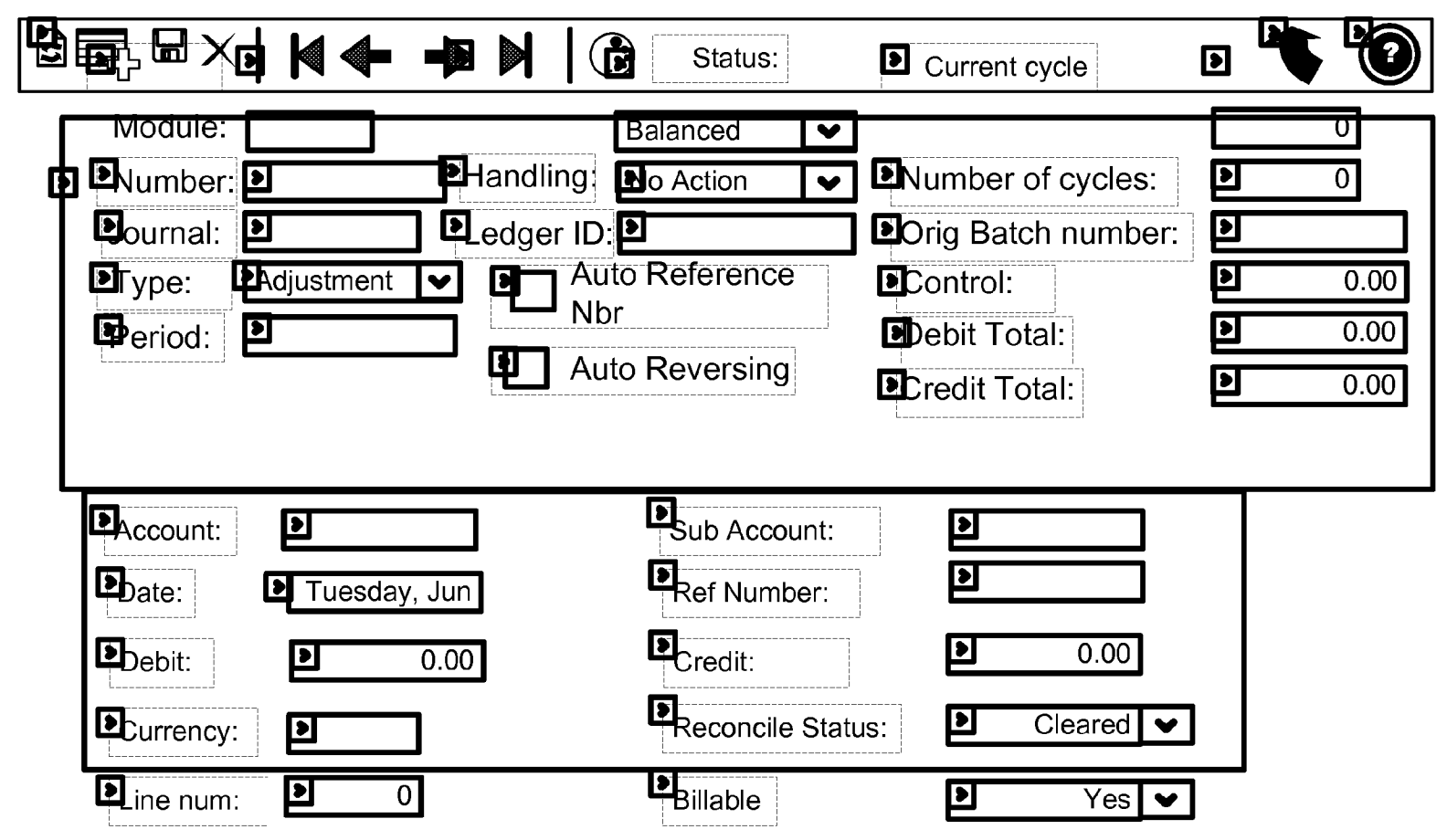

FIG. 6 illustrates an example of a screen shot of the design-time view with turned off rendering (Standard Visual Studio.NET appearance).

The following code (in C# language) is written to update document totals by adding a new document line and gives an example of the business logic illustrated in FIG. 6:

```
private void gltran_RowUpdated(SWCache sender, SWRowUpdatedEventArgs e)
{
    GLTran old=e.OldRow as GLTran;
    GLTran tran=e.Row as GLTran;
    if (old !=null && (tran.CuryCrAmt !=old.CuryCrAmt||tran.CuryDrAmt !=old.CuryDrAmt||tran.CrAmt !=old.CrAmt||tran.DrAmt !=old.DrAmt))
    {
        Batch batch=BatchModuleBatNbr[tran.Module, tran.BatNbr];
        if (batch !=null)
        {
            batch.CuryCrTot+=(tran.CuryCrAmt−old.CuryCrAmt);
```

```
    batch.CuryDrTot+=(tran.CuryDrAmt-old.Cury-
       DrAmt);
    batch.CrTot+=(tran.CrAmt-old.CrAmt);
    batch.DrTot+=(tran.DrAmt-old.DrAmt);
    BatchModuleBatNbr[tran.Module,    tran.BatNbr]=
       batch;
    }
   }
  }
}
```

The same result may be achieved with the DeltaSource attribute:
```
[SWDefault(0.0)]
[SWDBDouble( )]
[DeltaSource(typeof(Batch), Batch.Short.CuryDrTot)]
[SWUIField( )]
public virtual double? CuryDrAmt
{
   get {return CuryDrAmt;}
   set {_CuryDrAmt=value;}
}
```

This code's execution will result in document behavior shown in FIGS. 7 and 8, illustrating a screen shot of a form for creating a new document and a screen shot of a form for an updated document, respectively.

This following example of code illustrates disabling of controls when the document is not subjected to modifications because of its state:
```
public   void   Batch   RowSelected(SWCache   sender,
SWRowSelectedEventArgs e)
{
   Batch batch=e.Row as Batch;
   if (batch==null||batch.Status !="H")
   {
     SWUIFieldAttribute.SetEnabled(sender,   batch,   null,
        false);
     SWUIFieldAttribute.SetEnabled(sender, batch, Batch.S-
        hort.BatNbr, true);
     Caches[typeof(Batch)].AllowDelete=false;
     Caches[typeof(Batch)].AllowUpdate=false;
     Caches[typeof(GLTran)].AllowDelete=false;
     Caches[typeof(GLTran)].AllowUpdate=false;
     Caches[typeof(GLTran)].AllowInsert=false;
   }
   else
   {
     SWUIFieldAttribute.SetEnabled(sender, batch, null, true);
     SWUIFieldAttribute.SetEnabled(sender, batch, Batch.S-
        hort.Status, false);
     SWUIFieldAttribute.SetEnabled(sender, batch, Batch.S-
        hort.CuryCrTot, false);
     SWUIFieldAttribute.SetEnabled(sender, batch, Batch.S-
        hort.CuryDrTot, false);
     SWUIFieldAttribute.SetEnabled(sender, batch, Batch.S-
        hort.Module, false);
     Caches[typeof(Batch)].AllowDelete=true;
     Caches[typeof(Batch)].AllowUpdate=true;
     Caches[typeof(GLTran)].AllowDelete=true;
     Caches[typeof(GLTran)].AllowUpdate=true;
     Caches[typeof(GLTran)].AllowInsert=true;
   }
}
```

Figure 9:
FIG. 9 illustrates a screen shot of a form for a document with a hold status.

The code's execution will result in the behavior on the screen shown in FIGS. 9 and 10, illustrating a screen shot of a form for a document with a hold status and a screen shot of a form for a document with an un-posted status.

The developer is provided with a standard mechanism to handle multiple errors on the server side and return these errors back to the client. This piece of C# code gives an example of error handling:
```
[SWUIField(DisplayName="Ledger ID")]
[SWDBString(10)]
[SWSelector(typeof(Ledger))]
[SWDefault(typeof(GLSetup), Ledger.Short.LedgerID)]
public virtual string LedgerID
{
   get
   {
      return _LedgerID;
   }
   set
   {
      _LedgerID=value;
   }
}
[SWDefault(null)]
[SWUIField(DisplayName="Account ID")]
[SWDBString(10)]
[SWSelector(typeof(vs   AcctXref),   GLSetup.Full.Cp-
nyId)]
public virtual string Acct
{
   get
   {
      return _Acct;
   }
   set
   {
      _Acct=value;
   }
}
```

This code's execution will result in the following on the screen behavior shown in FIG. 11, illustrating a screen shot of an example of a form for a document with invalid values.

The embodiment provides the application programmer with a set of designers to simplify server objects and web forms creation. With the help of these designers the creation of application is performed.

FIG. 12 illustrates a screen shot of a table cache designer. The table cache designer automates table cache creation and modification. It could create table cache based on a database object, select statement or existing table cache. Virtual fields for objects that are not mapped to database are also supported.

Figure 13:
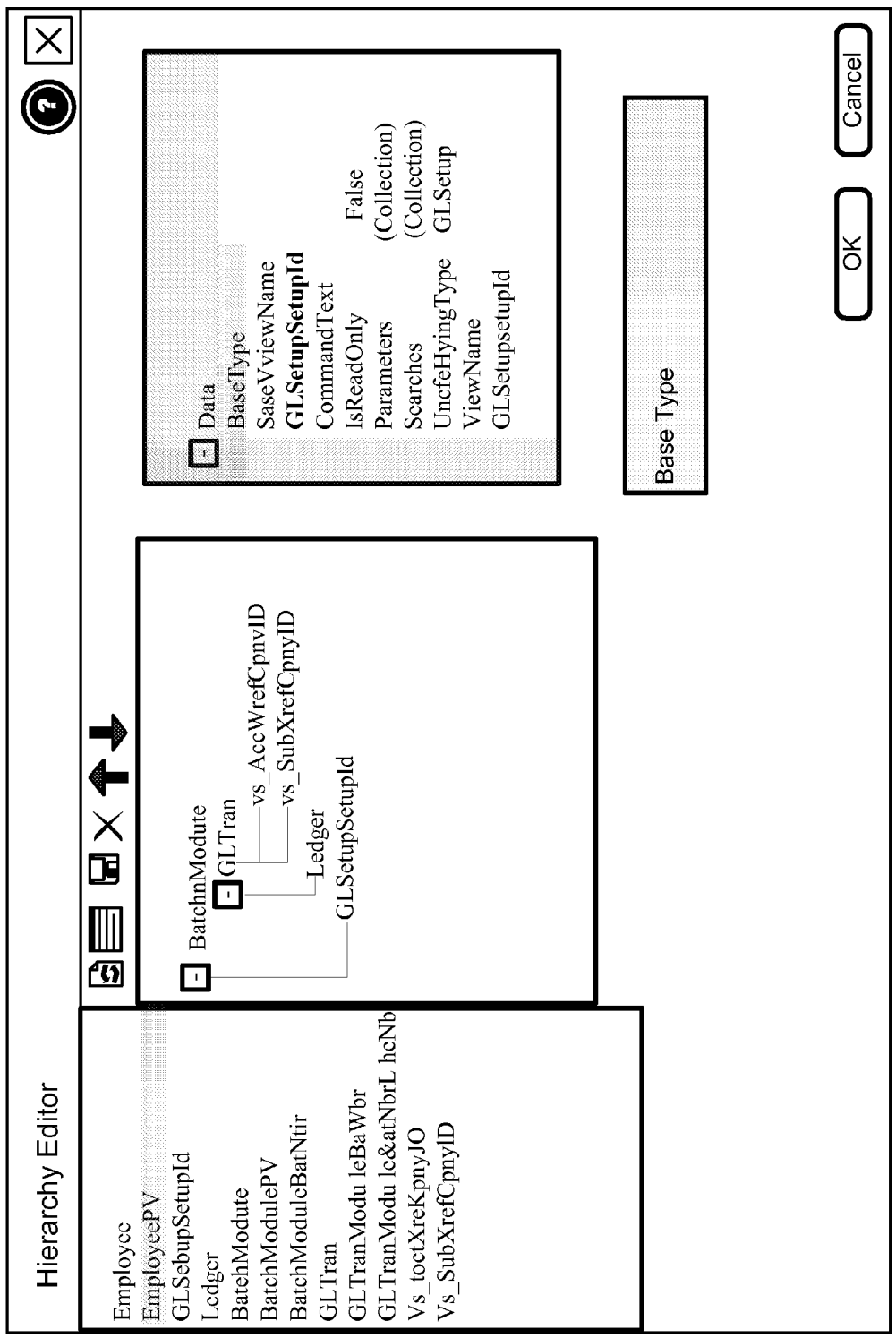
FIG. 13 illustrates a screen shot of a graph designer.

FIG. 13 illustrates a screen shot of a graph designer. The server object is based on a graph that in turn consists of a collection of table cashes. When creating a graph, the application programmer is responsible for specifying table caches that should be included into the graph and specifying their relationships and hierarchy. The application programmer could also override default insert, select, update and delete methods for each table cache inside graph object and specify if a modified instance of the table cache inside graph should be persisted between roundtrips.

The business logic inside the server object is implemented as set of functions that are subscribed to events triggered by the graph object on modification of its elements. FIG. 14 illustrates a screen shot of a web form designer. The web forms could be created on top of the server object.

However, manually adding of web controls to the form, setting control properties and binding controls to underlying server object is a very time consuming operations. Synchronization of the web form with the server object in case of a server object modification is an even more tedious operation. The Web From Designer has been developed to automate this. It reads the properties of the server object and table cache and maps them to appropriate web controls and sets default data formatting properties, captions, references and other control properties that could be derived from the server object and table caches. The programmer could override these default properties and create controls on the form or synchronize the form controls with the current server object scheme.

The business logic inside the server object is implemented as a set of functions that subscribe to the events triggered by the graph object upon modification of its elements. New and old values of the changed element and reference to the current graph instance are passed to the subscribing function as parameters. When the application programmer double-clicks on the control on the web form the graph element, that will be modified upon change of this control through binding expression, is selected. Also a function subscribed to this change event is created.

The reference to the current instance of graph is passed as one of the arguments. In this way when writing the function's code the application programmer could access the graph through its object model using strong enforcement of types.

Elements that have a visual representation (both static elements as well as dynamic elements that can be invoked when necessary) are as follows:
(1) fully hidden elements.
(2) Partly visible elements (only the visual mark is visible). For example, tables with a lot of elements, which cannot all be displayed simultaneously, fall into this category.
(3) Fully visible elements, i.e., with visible contents.
   The algorithm for the sequence of steps when a class 2 element is requested is as follows:
(1) The page is loaded
(2) The page is disassembled into the elements, each of which is processed based on the logic of the page and the HTML formatting of the code
(3) The selective element is transformed from a class 2 element to a class 3 element, based on receiving the content that corresponds to the class 2 element:
   a. Upon selection or some other action (for example, stopping the movement of the cursor), an event for the class 2 element is generated, which is then sent in the form of a request to the server;
   b. The request is analyzed on the server side, and an HTML description is formed, for the requested form. Note that the form can also be generated by referring to a database, which contains the requested entries, and, in some special cases, the transformation of the entries by using the business logic. In addition, the selection of the requested entries from the database can also require transformation and processing of the request by using the business logic;
   c. Receiving the HTML description of the requested form in the browser, on the client side;
   d. Processing the code of the requested form, and subscribing to events in the received form, for one or several static java scripts for processing the events;
   e. Presenting the received form on the screen.

If a particular element in the form changed its value, or if an element in its webpage changed a value, which can lead to a change in the database entry, or if the particular element is coupled, using business logic, to other elements of the webpage, the value of the element can be checked on the remote server. In this case, the entered, or selected from the context menu, value, is transmitted to a server, and business logic is applied on the server to the element value, based on the business logic of the user.

After processing the value of the element on the server, and detecting an error, the client's browser can receive data for correcting the current webpage. As a result, some of the elements in the page can change their properties, for example, background color, where an acceptable value has been entered, can change.

Figure 15:
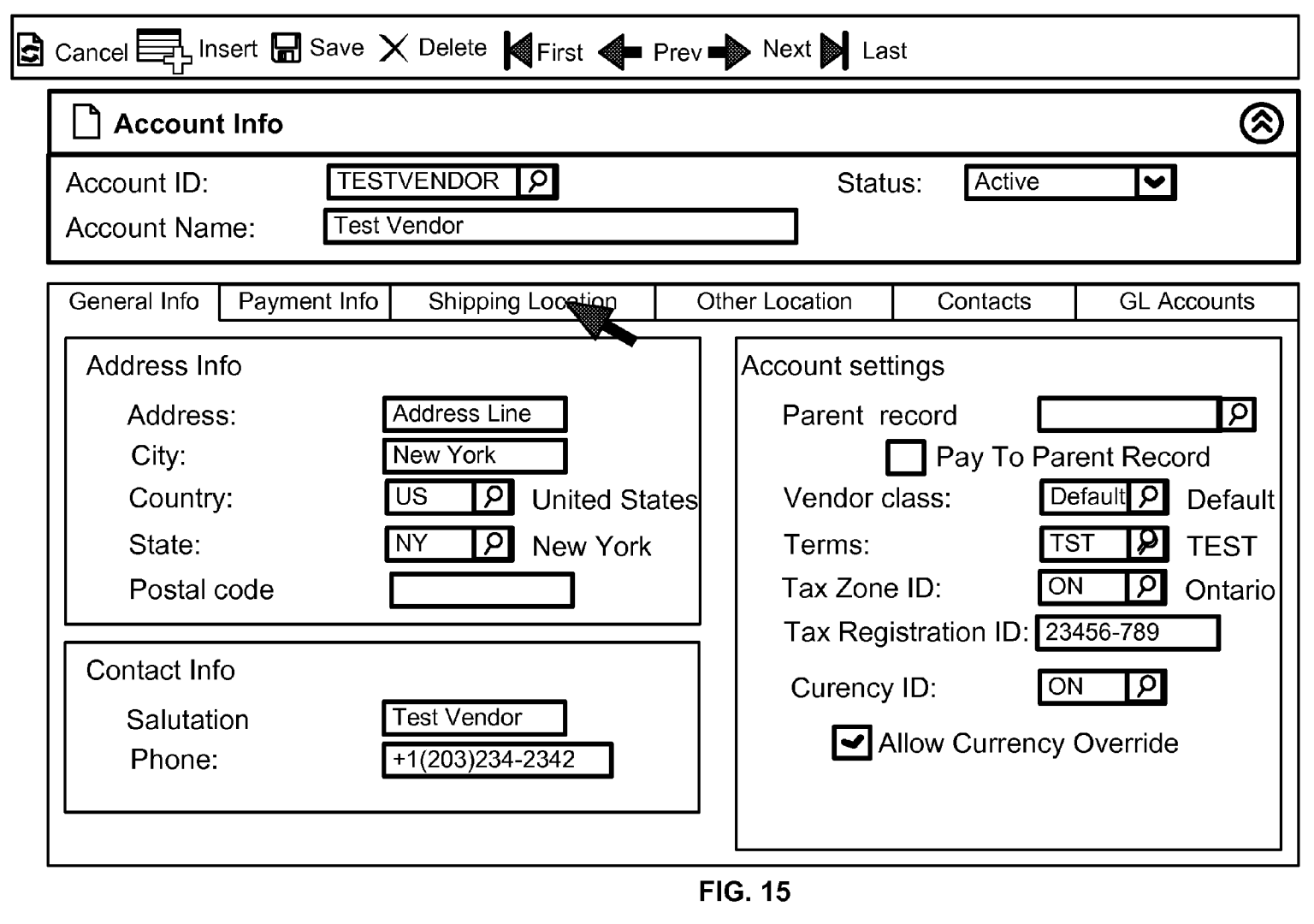
Figure 16:
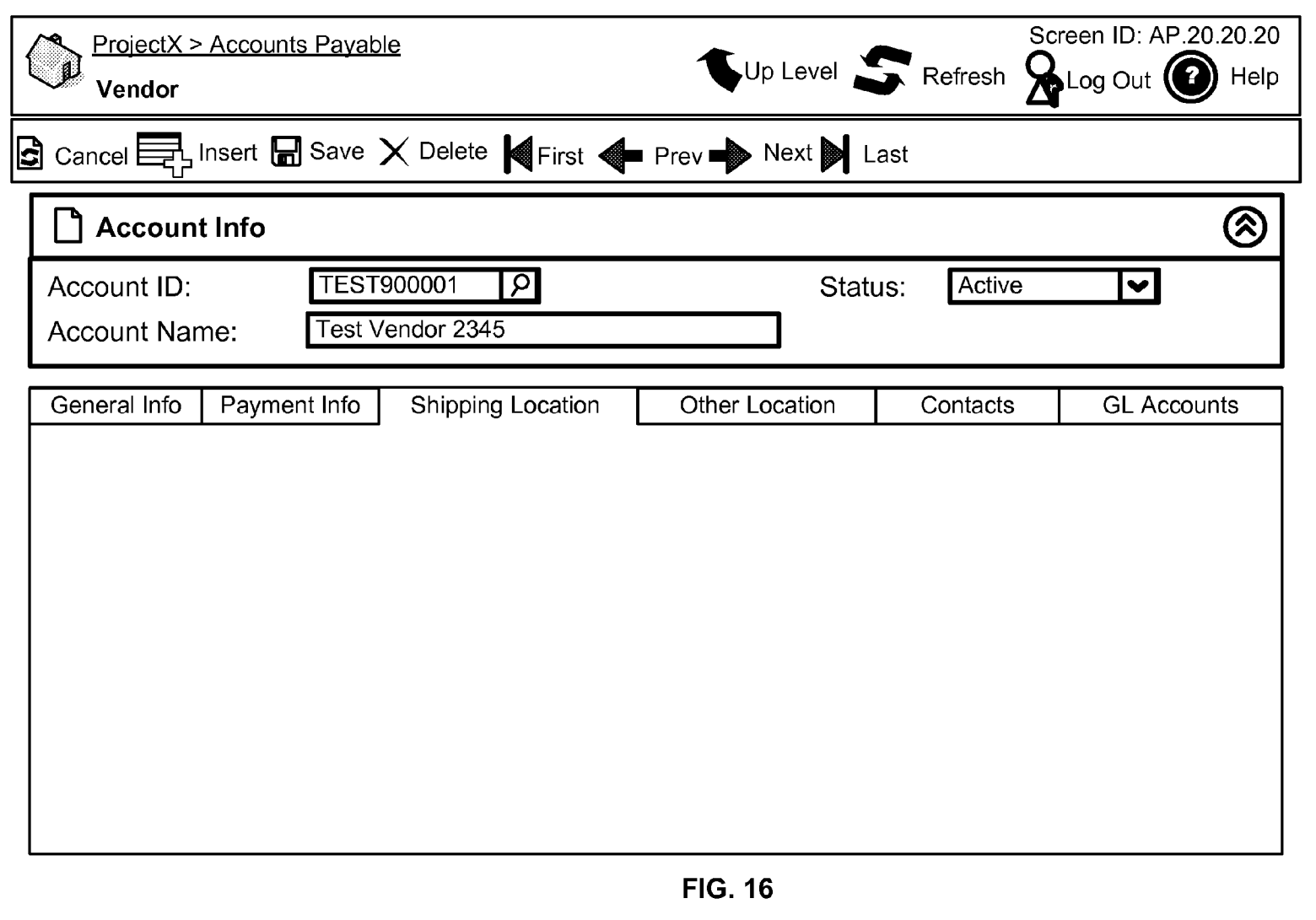

FIG. 15 illustrates a screen shot, where the tab "general info" is displayed, together with its contents, while the user is opening the field "shifting location", which initially is represented by the tab. The cursor is brought to the tab "shipping location" and upon clicking on it, events are generated. One of the events opens an initially empty field (see FIG. 16), while another event forms the request for the field content, which is sent to the server.

To receive the content of the field "shipping location," a data exchange with the server is conducted. While the server processes the request and forms the HTML description of the requested form on the screen, together with a tab, an empty space for the field shipping location is shown. Note that shipping location is a class 2 element.

Figure 17:
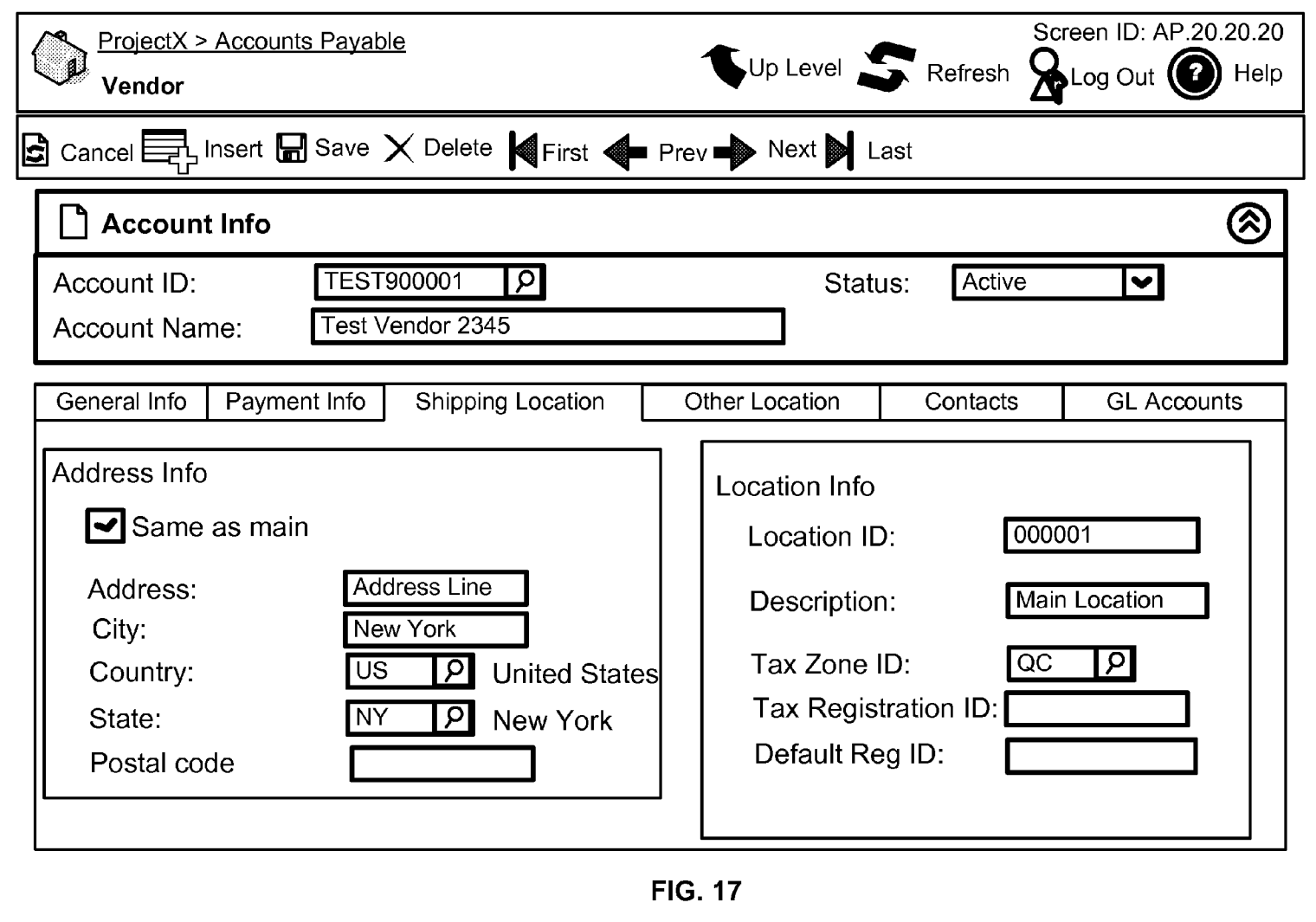

FIG. 17 illustrates a screen shot of what happens after the client receives the HTML description, and processes the received content using the browser and java scripts. The contents of the field "shipping location" is displayed on the screen, in other words, the browser displays class 3 elements, for example, the lines "address line 1", "address line 2", "address line 3", etc., which are all class 3 elements.

Figure 19:
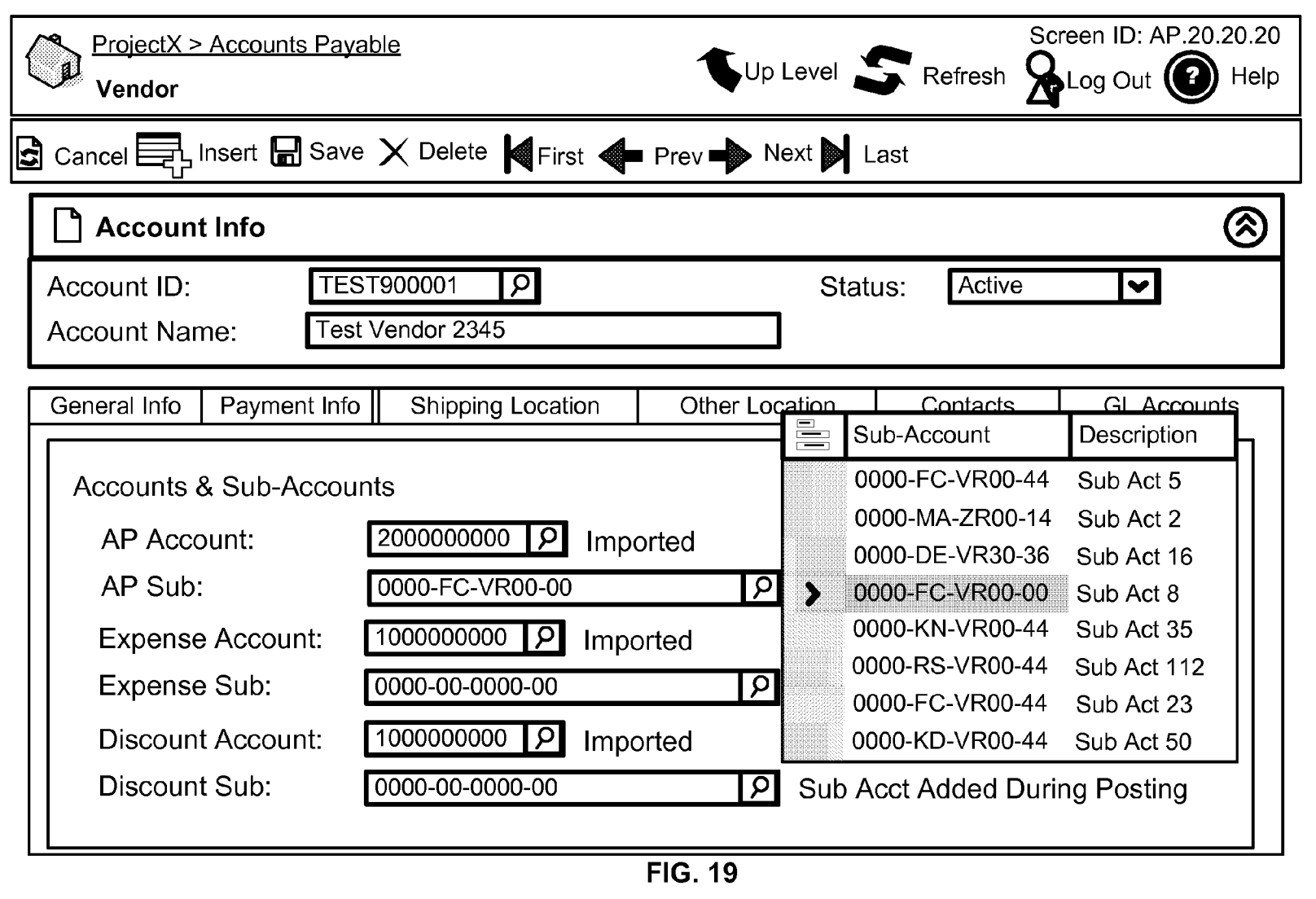

FIGS. 18 and 19 illustrate another embodiment of the invention. FIG. 18 shows a screenshot of the general ledger accounts. In order to enter data into the field on the line called "AP SUB", it is possible to use a table of permissible values. The table is formed by the server, based on the content of the fields of the business object that have already been filled in. Object properties, defined by the entries in the database, and the business logic. To select the table, the user clicks on the marker "magnifying glass". Upon the click, an event is generated, which sends the request for the table entries to the server. Note that before receiving the data for the table, from the server, the user screen might not change. In one particular case, the second event can form a message (not shown in the figures) to inform the user that the request has been sent, and is being processed. The server, by using the available data in the database and the business logic, forms the data for filling the table, the corresponding HTML code, and sends it to the users browser.

As shown in FIG. 19, by using the browser on the client's side, the code of the refreshed form is processed, where the code contains events. In this case, after processing the visual rendering request relating to the line "AP SUB", the contents of the table is displayed. Elements of the tab "GL Accounts" and the rendered table belong to class 3 elements. The table might also contain class 2 elements. In this case, these would be page numbers of the table, for faster searching within the table, since not all of the table contents can be rendered on clicking on the magnifying glass.

Figure 20:
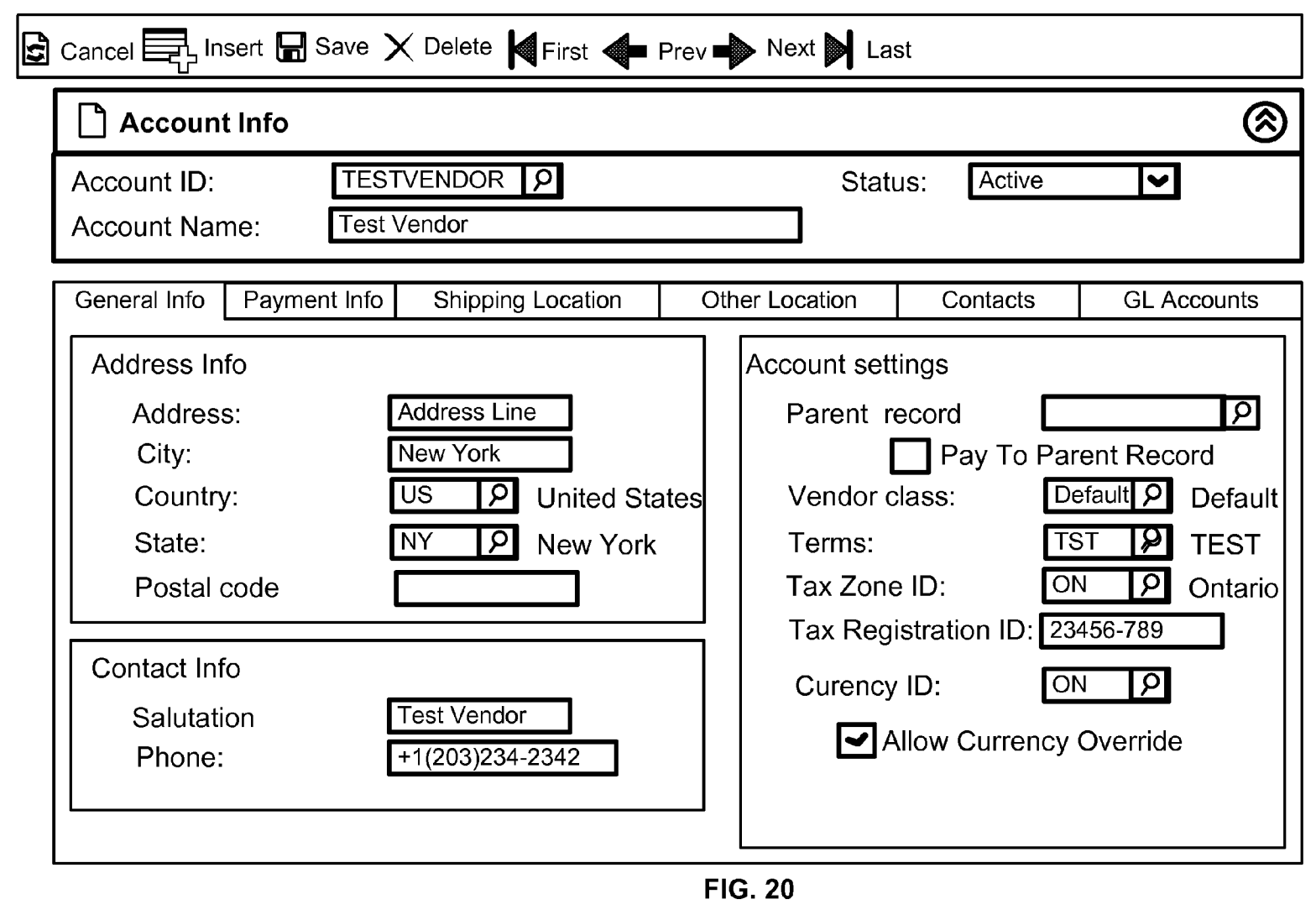

FIG. 20 illustrates another screenshot, where in this particular instance, the entered or selected (by the user) data might not correspond to requirements of the business logic, the format, or the inherently erroneous. In the example described earlier, the fields in the table are formed based on data located on the server, which means that entries changed by the user and not yet transferred to the server might not be taken in to account, when the fields for user selection are generated. For example, in the "general info" tab, the main fields are filled in. the screenshot shows class 2 elements, such as the other tabs "payment info", "shipping location", "other locations", "contacts" and "GL accounts." Upon user request, these can be converted into class 3 elements.

Figure 21:
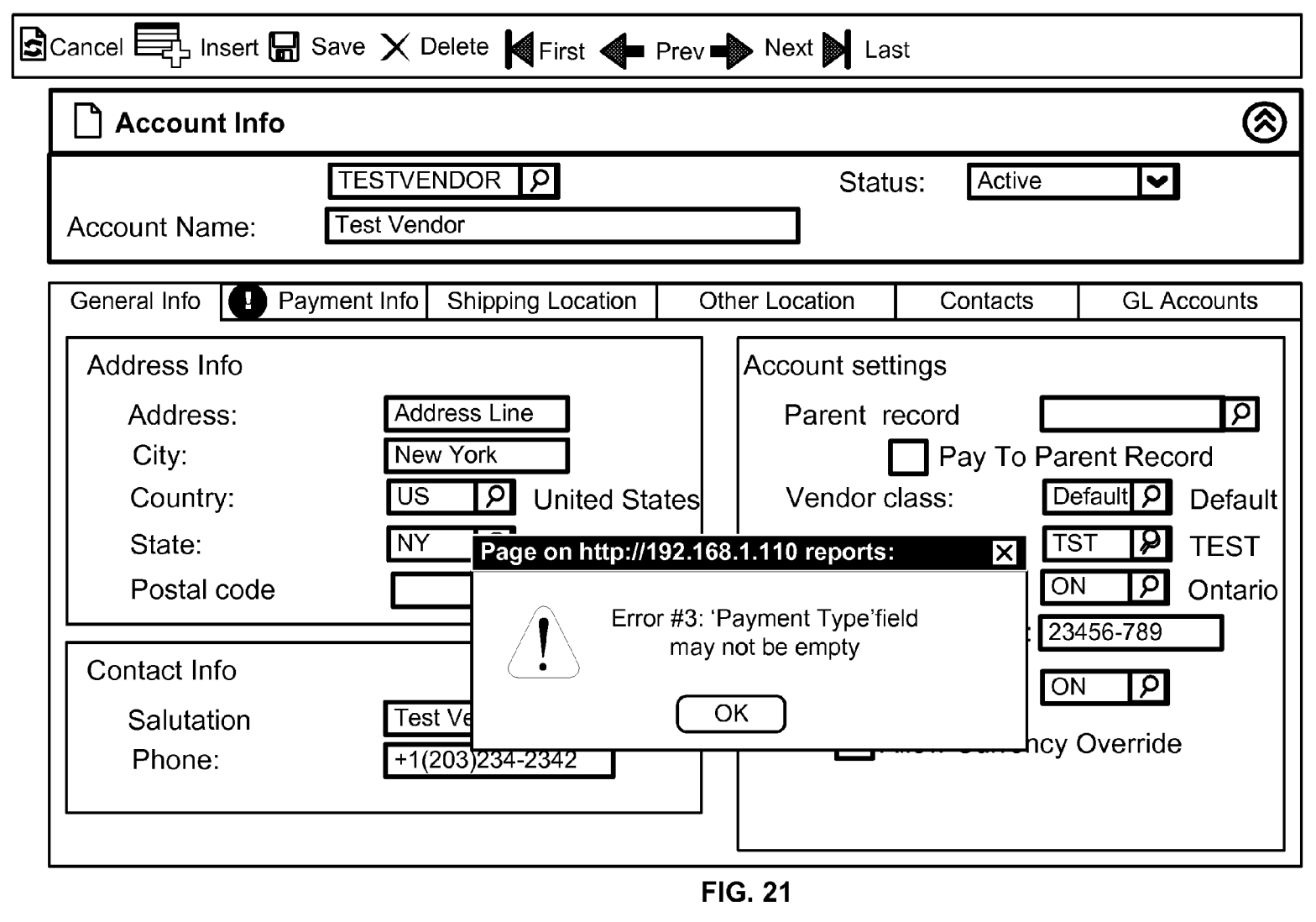

FIG. 21 illustrates an example of space shot with error notification to the user. When the user attempts to save the new data within the "general info" tab, and create a new business object, for example, an accounting entry, this affects other elements, particularly, the elements in the "payment info" tab. FIG. 7 shows how in the current window (see also FIG. 20) another window is displayed, which in forms the user about the error, and identifies the field in which the error occurred. Also, in addition to notifying the user using a window, the properties of the line of the corresponding tab have changed. This affects the tab that has elements which conflict with the newly entered data. Changing the properties of the tab also leads to the appearance of a symbol, here, the exclamation sign inside the red circle, which also informs the user about the error.

Having thus described the different embodiments of a system and method, it should be apparent to those skilled in the art that certain advantages of the described method and system have been achieved. In particular, it should be appreciated by those skilled in the art that the same attributes with several handlers are used. Also, it will be appreciated that the active records technology employs the attributes together with the called method, but does not require full interaction with the method.

It should also be appreciated that various modifications, adaptations, and alternative embodiments thereof may be made within the scope and spirit of the present invention. The invention is further defined by the following claims.

What is claimed is:

1. A method for managing dynamic content of a website, the method comprising:

creating a static content assigned to the dynamic content of the website, the static content including unmodifiable scripts;

creating an active content for processing the dynamic content, the active content including class 1 and class 2 elements, wherein the class 1 elements are hidden from the user, the class 2 elements have only visual marks representation in the browser;

uploading the static content to a user upon request;

selecting, in response to a use command, links to the active content within the static content;

requesting description of the active content from a remote server;

executing the active content as a part of the static content on the server's side;

uploading the active content to the user;

displaying the active content as a part of the static content to the user; and processing a dynamic content using the active content, the dynamic content including class 3 elements that are visual representations of business object data requested by the user;

representing, to the user, a document form generated from a first HTML description and the unmodifiable java scripts, wherein the document form includes class 1, class 2 and class 3 elements configured to perform event generation, wherein the class 1 elements are hidden from the user, the class 2 elements have only visual marks representation in the browser, and the class 3 elements are visual representations of the business object data requested by the user;

upon user input, generating a request to the server for a class 2 element;

on the server, generating a second HTML description of an additional form;

delivering the second HTML description to the browser;

in the browser, parsing the second HTML description, and subscribing the unmodifiable java scripts to events in the second HTML description; and inside the form, representing, to the user, the class 2 element translated to a class 3 element generated from the second HTML description.

2. The method of claim 1, further comprising caching the static and the active content as a consistent page.

3. A method for dynamic data representation over a network, wherein the network connects a client computer to a server, wherein the client computer has a browser capable of dynamic form creation and representation from data related to an object model, wherein the server is an application server able to generate a first HTML description of a form, containing representation and a data model for the object model, wherein the form contains data for business object representation and unmodifiable java scripts, the method comprising:

on the client computer, reading and parsing the first HTML description;

registering the parsed objects in the object model and subscribing a set of unmodifiable java scripts to events of the object model;

representing, to the user, a document form generated from the first HTML description and the unmodifiable java scripts, wherein the document form includes class 1, class 2 and class 3 elements configured to perform event generation, wherein the class 1 elements are hidden from the user, the class 2 elements have only visual marks representation in the browser, and the class 3 elements are visual representations of the business object data requested by the user;

upon user input, generating a request to the server for a class 2 element;

on the server, generating a second HTML description of an additional form;

delivering the second HTML description to the browser;

in the browser, parsing the second HTML description, and subscribing the unmodifiable java scripts to events in the second HTML description; and inside the form, representing, to the user, the class 2 element translated to a class 3 element generated from the second HTML description.

4. The method of claim 3, wherein the first HTML description is generated for representation of a visible part of the form generated by the browser.

5. The method of claim 3, wherein the object model is a DOM2 object model.

6. The method of claim 3, wherein:

the unmodifiable java scripts are assigned, in the browser, to the dynamic data handling, the method further comprising:

upon a user request to the browser for the business object representation, generating, on the server, the HTML description of the form related to the visible part of data corresponding to the user request;

transmitting the HTML description of form to the browser;

using the browser, parsing the HTML description of the form;

subscribing the unmodifiable java scripts to the events generated by the HTML description of form.

7. The method of claim 6, further comprising:
using the browser, updating a business object with a new value;
transmitting the new value to the server;
using business logic of the server, detecting if the new value requires modification;
if the new value requires modification, generating and transmitting to the browser an updated HTML description of the form with updated class 2 element;
wherein the updated class 2 element indicates that the business object requires modification; and
in the browser, changing visual mark representation of the class 2 element to an updated class 2 element.

8. The method of claim 7, wherein the new value requires modification if a business logic error is identified.

9. A non-transitory computer useable recording medium having computer executable program logic stored thereon for executing on a processor, the program logic comprising computer program code for implementing the steps of claim 3.

10. A system for dynamic data representation over a network, wherein the network connects a client computer to a server, and the client computer has a browser capable of dynamic form creation and representation from data related to an object model, the server being an application server able to generate HTML description of a form, containing representation and a data model for the object model, the form including data for business object representation, and unmodifiable java scripts, the system comprising:
on the client computer, means for reading and parsing the HTML description of the form; and
on the client computer, means for registering the parsed objects in the object model and subscribing a set of unmodifiable java scripts to events of the object model;
means for representing, to the user, a document form generated from the first HTML description and the unmodifiable java scripts, wherein the document form includes class 1, class 2 and class 3 elements configured to perform event generation,
wherein the class 1 elements are hidden from the user, the class 2 elements have only visual marks representation in the browser, and the class 3 elements are visual representations of the business object data requested by the user;
upon user input, means for generating a request to the server for a class 2 element;
on the server, means for generating a second HTML description of an additional form;
means for delivering the second HTML description to the browser;
in the browser, means for parsing the second HTML description, and subscribing the unmodifiable java scripts to events in the second HTML description; and
inside the form, means for representing, to the user, the class 2 element translated to a class 3 element generated from the second HTML description.

11. The system of claim 10, wherein the first HTML description of the form is generated for representation of a visible part of form generated by the browser.

12. The system of claim 10, wherein the object model is a DOM2 object model.

13. The system of claim 10, wherein:
the unmodifiable java scripts are assigned, in the browser, to the dynamic data handling,
the method further comprising:
upon a user request to the browser for the business object representation, generating, on the server, the first HTML description related to the visible part of data corresponding to the user request;
transmitting the first HTML description of form to the browser;
using the browser, parsing the first HTML description;
subscribing the unmodifiable java scripts to the events generated by the first HTML.

14. The system of claim 13, wherein the system:
using the browser, updates a business object with a new value;
transmits the new value to the server;
using business logic of the server, detects if the new value requires modification;
if the new value requires modification, generates and transmits to the browser an updated first HTML description of the form with updated class 2 element;
wherein the updated class 2 element indicates that the business object requires modification; and
in the browser, changes visual mark representation of the class 2 element to an updated class 2 element.

* * * * *